(12) United States Patent
Mitrovich (10) Patent No.: US 8,631,818 B2
(45) Date of Patent: Jan. 21, 2014

(54) VERTICAL FLOAT VALVE ASSEMBLY

(76) Inventor: Michael J. Mitrovich, Kenmore, WA (US)

( * ) Notice: Subject to any disclaimer, the term of this patent is extended or adjusted under 35 U.S.C. 154(b) by 234 days.

(21) Appl. No.: 13/183,905

(22) Filed: Jul. 15, 2011

(65) Prior Publication Data

US 2013/0000751 A1 Jan. 3, 2013

Related U.S. Application Data

(60) Provisional application No. 61/502,301, filed on Jun. 28, 2011.

(51) Int. Cl.
*F16K 31/26* (2006.01)

(52) U.S. Cl.
USPC ............ 137/446; 137/429; 137/434; 137/439

(58) Field of Classification Search
USPC ......... 137/409, 429, 434, 437, 439, 442, 446, 137/192, 202
See application file for complete search history.

(56) References Cited

U.S. PATENT DOCUMENTS

| | | | |
|---|---|---|---|
| 751,096 A | 2/1904 | Nethery | |
| 927,368 A * | 7/1909 | Mauldin | 137/426 |
| 993,628 A | 5/1911 | Williams | |
| 1,153,381 A | 9/1915 | Gudmundsen | |
| 1,193,007 A | 8/1916 | Fuller | |
| 1,302,538 A | 5/1919 | Gulick | |
| 1,335,188 A | 3/1920 | Peycke | |
| 1,440,107 A | 12/1922 | Rubin | |
| 1,525,247 A | 2/1925 | Leiss | |
| 1,541,110 A | 6/1925 | Buscher | |
| 1,555,755 A | 9/1925 | Pratt | |
| 1,676,084 A | 7/1928 | Flagg | |
| 1,694,072 A | 12/1928 | Manion | |
| 1,736,368 A * | 11/1929 | Ricard | 137/329.03 |
| 1,788,827 A | 1/1931 | Ferrin | |
| 1,826,088 A | 10/1931 | Ostlind | |
| 2,092,670 A | 9/1937 | Hess et al. | |
| 2,317,382 A | 4/1943 | Hubbell | |
| 2,477,186 A | 7/1949 | Koehler | |
| 2,595,166 A | 4/1952 | Rhodes | |
| 2,825,526 A | 3/1958 | Zuiderhoek | |
| 3,020,924 A | 2/1962 | Davies | |
| 3,055,405 A | 9/1962 | Pase | |
| 3,156,271 A | 11/1964 | Schnurmann | |

(Continued)

FOREIGN PATENT DOCUMENTS

DE 4337183 A1 5/1995
EP 144549 6/1985

(Continued)

OTHER PUBLICATIONS

Written Opinion of the International Searching Authority, PCT/US2012/042058, Sep. 21, 2012.

(Continued)

*Primary Examiner* — Craig Schneider
(74) *Attorney, Agent, or Firm* — Buchanan Nipper (57) ABSTRACT

A vertical float valve for use in a fluid reservoir. The vertical float valve able to open and closed based upon the level of fluid within the fluid reservoir. The vertical float valve having a body portion. The body portion attached to a float portion via a four bar (4-bar) linkage.

19 Claims, 7 Drawing Sheets

(56) References Cited

U.S. PATENT DOCUMENTS

| | | | |
|---|---|---|---|
| 3,168,105 | A | 2/1965 | Cisco et al. |
| 3,269,404 | A | 8/1966 | Lebow |
| 3,335,746 | A | 8/1967 | Lebow |
| 3,406,709 | A | 10/1968 | Elbogen et al. |
| 3,485,262 | A | 12/1969 | Perren |
| 3,561,464 | A | 2/1971 | Sher et al. |
| 3,587,622 | A | 6/1971 | Hardison |
| 3,599,659 | A * | 8/1971 | Nuter et al. ............... 137/202 |
| 3,618,643 | A | 11/1971 | Thomson et al. |
| 3,662,793 | A | 5/1972 | Calisher et al. |
| 3,892,254 | A | 7/1975 | Hilgert |
| 3,907,248 | A | 9/1975 | Coulbeck |
| 3,929,155 | A | 12/1975 | Garretson |
| 3,955,641 | A | 5/1976 | Smitley |
| 3,982,557 | A | 9/1976 | Acevedo |
| 4,006,762 | A | 2/1977 | Badger |
| 4,024,887 | A | 5/1977 | McGregor |
| 4,064,907 | A | 12/1977 | Billington et al. |
| 4,075,912 | A | 2/1978 | Schaefer |
| 4,161,188 | A | 7/1979 | Jorgensen |
| 4,292,996 | A | 10/1981 | Pataki et al. |
| 4,305,422 | A | 12/1981 | Bannink |
| 4,312,373 | A | 1/1982 | Tilling et al. |
| 4,313,459 | A | 2/1982 | Mylander |
| 4,515,178 | A | 5/1985 | Campau |
| 4,527,593 | A | 7/1985 | Campau |
| 4,770,317 | A | 9/1988 | Podgers et al. |
| 5,002,154 | A | 3/1991 | Chen |
| 5,027,871 | A | 7/1991 | Guenther |
| 5,279,121 | A | 1/1994 | Barber |
| 5,282,496 | A | 2/1994 | Kerger |
| 5,285,812 | A | 2/1994 | Morales |
| 5,354,101 | A | 10/1994 | Anderson, Jr. |
| 5,454,421 | A | 10/1995 | Kerger et al. |
| 5,460,197 | A | 10/1995 | Kerger et al. |
| 5,487,404 | A | 1/1996 | Kerger |
| 5,642,752 | A | 7/1997 | Yokota et al. |
| 5,649,577 | A | 7/1997 | Farkas |
| 5,787,942 | A | 8/1998 | Preston et al. |
| 5,813,432 | A | 9/1998 | Elsdon et al. |
| 5,829,465 | A | 11/1998 | Garretson |
| 5,832,953 | A | 11/1998 | Lattner et al. |
| 5,842,500 | A | 12/1998 | Rockwood et al. |
| 5,887,609 | A | 3/1999 | Garretson |
| 5,921,272 | A | 7/1999 | Cavagna |
| 5,954,101 | A | 9/1999 | Drube et al. |
| 5,992,445 | A | 11/1999 | Pagani |
| 6,026,841 | A | 2/2000 | Kozik |
| D421,788 | S | 3/2000 | Kingman et al. |
| 6,035,888 | A | 3/2000 | Gil |
| 6,076,546 | A | 6/2000 | Waters |
| 6,078,850 | A | 6/2000 | Kane et al. |
| 6,079,438 | A | 6/2000 | Cavagna |
| 6,082,392 | A | 7/2000 | Watkins, Jr. |
| 6,109,314 | A | 8/2000 | Christophe et al. |
| 6,138,709 | A | 10/2000 | Home |
| 6,142,175 | A * | 11/2000 | Ku ............... 137/446 |
| 6,178,994 | B1 | 1/2001 | Park |
| 6,227,233 | B1 | 5/2001 | Kozik |
| 6,230,730 | B1 | 5/2001 | Garretson |
| 6,247,492 | B1 | 6/2001 | Stuart |
| 6,257,287 | B1 | 7/2001 | Kippe et al. |
| 6,263,905 | B1 | 7/2001 | Yokota et al. |
| 6,293,302 | B1 | 9/2001 | Waters et al. |
| 6,311,723 | B1 | 11/2001 | Shipp et al. |
| 6,318,406 | B1 | 11/2001 | Conley |
| 6,318,421 | B1 | 11/2001 | Lagache |
| 6,408,869 | B1 | 6/2002 | Bartos et al. |
| 6,415,813 | B1 | 7/2002 | Kraft |
| 6,450,196 | B1 | 9/2002 | Bartos et al. |
| 6,536,465 | B2 | 3/2003 | David et al. |
| 6,557,579 | B2 | 5/2003 | Kozik |
| 6,640,829 | B1 | 11/2003 | Kerger |
| 6,783,330 | B2 * | 8/2004 | Carnes et al. ............... 417/200 |
| 6,810,905 | B1 | 11/2004 | Watson et al. |
| 6,837,262 | B2 | 1/2005 | Cortez et al. |
| 6,837,263 | B2 | 1/2005 | Kramer |
| 6,874,528 | B2 | 4/2005 | Kozik et al. |
| 6,910,499 | B2 | 6/2005 | Chan |
| 7,089,974 | B2 | 8/2006 | Stuart |
| 7,219,686 | B2 * | 5/2007 | Schmitz et al. ............... 137/413 |
| 7,240,690 | B2 * | 7/2007 | Schmitz et al. ............... 137/413 |
| 7,258,130 | B2 | 8/2007 | Cortez |
| D559,358 | S | 1/2008 | Moura de Olieveira |
| 7,584,766 | B2 | 9/2009 | David et al. |
| 7,589,939 | B2 * | 9/2009 | Wakul et al. ............... 360/324.1 |
| 7,647,163 | B2 | 1/2010 | Allen |
| 7,757,709 | B2 | 7/2010 | Cortez |
| 7,793,682 | B2 | 9/2010 | Smit |
| 7,891,373 | B2 | 2/2011 | Workman et al. |
| 8,025,076 | B2 | 9/2011 | Smit |
| 2008/0178944 | A1 | 7/2008 | Workman et al. |
| 2011/0079320 | A1 | 4/2011 | Mitrovich et al. |

FOREIGN PATENT DOCUMENTS

| | | |
|---|---|---|
| GB | 1153381 | 5/1969 |
| GB | 1193007 | 5/1970 |
| GB | 1335188 | 10/1973 |
| GB | 1440107 | 6/1976 |
| GB | 1541110 | 2/1979 |
| GB | 2317382 | 3/1998 |
| GB | 2325220 A | 11/1998 |
| GB | 2333167 A | 7/1999 |
| JP | 6069839 B2 | 9/1994 |
| JP | 2003-506238 A | 2/2003 |
| JP | 2004-116858 A | 4/2004 |
| KR | 10-2002-0059682 A | 7/2002 |
| SU | 492859 A1 | 11/1975 |
| SU | 1188706 A1 | 10/1985 |
| SU | 1264145 A1 | 10/1986 |

OTHER PUBLICATIONS

International Search Report, PCT/US2012/042058, Sep. 21, 2012.
Office Action dated Feb. 13, 2012, Applicant's copending U.S. Appl. No. 12/485,646.
Pursuant to MPEP § 2001.6(b) Applicant brings the following co-pending application to the Examiner's attention: U.S. Appl. No. 12/767,310.
Pursuant to MPEP § 2001.6(b) Applicant brings the following co-pending application to the Examiner's attention: U.S. Appl. No. 12/485,646.
International Search Report and Written Opinion, PCT/US2011/030445, Dec. 7, 2011, which cites the above four foreign references and indicates the degree of relevance found by the International Searching Authority for said references.
International Search Report and Written Opinion, PCT/US2012/058783, dated Mar. 21, 2013.

* cited by examiner

VERTICAL FLOAT VALVE ASSEMBLY

PRIORITY

This application is a non-provisional of application Ser. No. 61/502,301, filed 28 Jun. 2011, the disclosure of which is incorporated herein by reference.

TECHNICAL FIELD

The disclosure generally relates to the field of valves. Particular embodiments relate to shut-off valves.

BACKGROUND

A variety of applications require the ability to rapidly fill a container with a fluid. To accomplish this rapid filling, the fluid is typically pumped (under pressure) into the container. Due to this rapid filling, such applications typically include means for quickly shutting off the flow of fluid when the container reaches a predetermined level of fluid held therein so as to prevent overfilling and/or spillage of the fluid. Such means including, but not limited to, float valves.

Many such containers, for instance locomotive fuel tanks, include internal baffles for preventing fuel from sloshing back and forth due to the motion of the locomotive. The position and orientation of these baffles within a fuel tank can cause great difficulty in the installation and operation of float valves, in that float valves typically have an arm which extends from the valve, a float being located or attached to the arm. If this arm, or the float attached there-to, contacts an internal baffle, the operation of the float valve can be compromised, leading to failure of the float valve to correctly close.

SUMMARY OF THE DISCLOSURE

Several exemplary float valves are described herein.

An exemplary float valve comprises a float valve having a body housing and a float. The float for opening and closing the float valve. The float connects with the body housing via a four bar linkage. The float valve has an open position where fluid may flow from a fluid source, through the body housing and into a container. The float valve has a closed position where fluid is prevented from flowing through the body housing. The open and closed positions controlled by the raising and lowering of the float.

Another exemplary float valve comprises a valve assembly for use in a fluid reservoir. The valve assembly comprising a body housing, a first parallel link assembly, a second parallel link assembly and a float arm assembly. The body housing comprising a valve chamber with an inlet and an outlet. The outlet comprising a valve sealing device. The body housing comprising a valve closure element positioned in the valve chamber and normally held in closed relationship to the valve sealing device via a biasing means. The valve closure element movable into and out of fluid sealing engagement with the valve sealing device. The first parallel link assembly comprising a first end and a second end defining a longitudinal axis. The first parallel link assembly first end pivotally connected to the body housing adjacent the outlet at a first pivotal connector. The first parallel link assembly second end pivotally connected to the float arm assembly at a second pivotal connector. The second parallel link assembly comprising a first end and a second end defining a longitudinal axis. The second parallel link assembly first end pivotally connected to the body housing at a third pivotal connector. The second parallel link assembly second end pivotally connected to the float arm assembly at a fourth pivotal connector. The float arm assembly positionable within the fluid reservoir to respond to a fluid level therein. The second parallel link assembly longitudinal axis is parallel to the first parallel link assembly longitudinal axis. The first pivotal connector and the third pivotal connector define a housing connector axis there-between. The second pivotal connector and the fourth pivotal connector define a float connector axis there-between. The housing connector axis is parallel to the float connector axis.

Another exemplary float valve comprises a valve assembly for use in a fluid reservoir. The valve assembly comprising a body housing, a first parallel link assembly, a second parallel link assembly and a float arm assembly. The body housing comprising a valve chamber with an inlet and an outlet. The outlet defining a seat. The body housing comprising a piston positioned in the valve chamber. The piston comprising a sealing means for sealing engagement to the seat. The sealing means normally held in closed relationship to the seat via a spring. The sealing means movable into and out of fluid sealing engagement with the seat. The first parallel link assembly comprising a first end and a second end defining a longitudinal axis. The first parallel link assembly first end pivotally connected to the body housing adjacent the outlet at a first pivotal connector. The first parallel link assembly second end pivotally connected to the float arm assembly at a second pivotal connector. The second parallel link assembly comprising a first end and a second end defining a longitudinal axis. The second parallel link assembly first end pivotally connected to the body housing at a third pivotal connector. The second parallel link assembly second end pivotally connected to the float arm assembly at a fourth pivotal connector. The float arm assembly positionable within the fluid reservoir to respond to a fluid level therein.

Additional understanding of the devices and methods contemplated and/or claimed by the inventor can be gained by reviewing the detailed description of exemplary devices and methods, presented below, and the referenced drawings.

DETAILED DESCRIPTION

The following description and the referenced drawings provide illustrative examples of that which the inventor regards as his invention. As such, the embodiments discussed herein are merely exemplary in nature and are not intended to limit the scope of the invention, or its protection, in any manner. Rather, the description and illustration of these embodiments serve to enable a person of ordinary skill in the relevant art to practice the invention.

The use of "e.g.," "etc," "for instance," "in example," and "or" and grammatically related terms indicates non-exclusive alternatives without limitation, unless otherwise noted. The use of "including" and grammatically related terms means "including, but not limited to," unless otherwise noted. The use of the articles "a," "an" and "the" are meant to be interpreted as referring to the singular as well as the plural, unless the context clearly dictates otherwise. Thus, for example, reference to "a float" includes two or more such floats, and the like. The use of "exemplary" means "an example of" and is not intended to convey a meaning of an ideal or preferred embodiment.

The exemplary vertical float valve assembly described herein utilizes a four-bar (4-bar) linkage to interconnect the float arm assembly to the body of the float valve assembly. This allows for a much more compact configuration which is less likely to contact an internal baffle of the container on which the vertical float valve assembly is attached.

Figure 1:
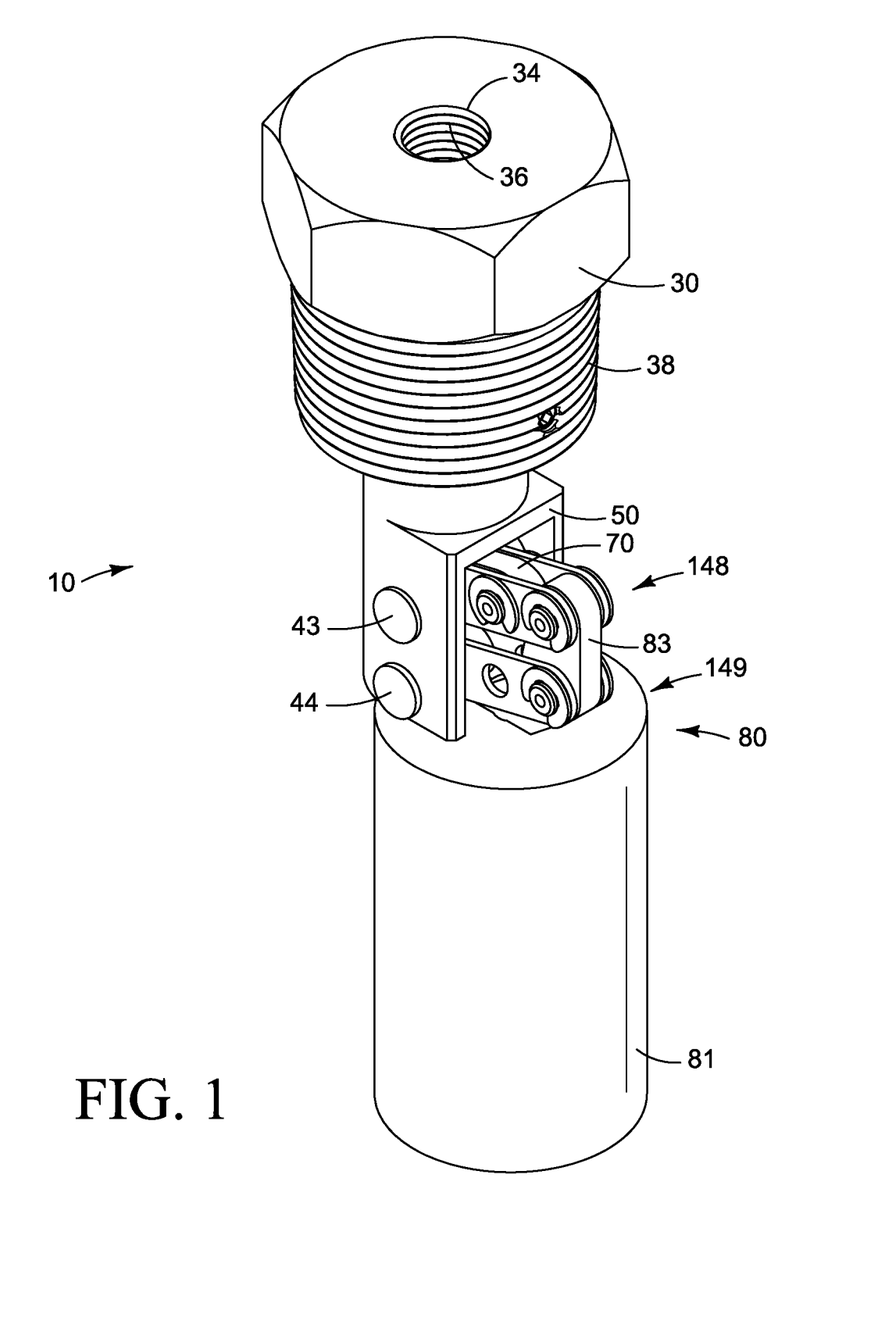
FIG. 1 is a perspective view of a first exemplary vertical float valve assembly.
Figure 2:
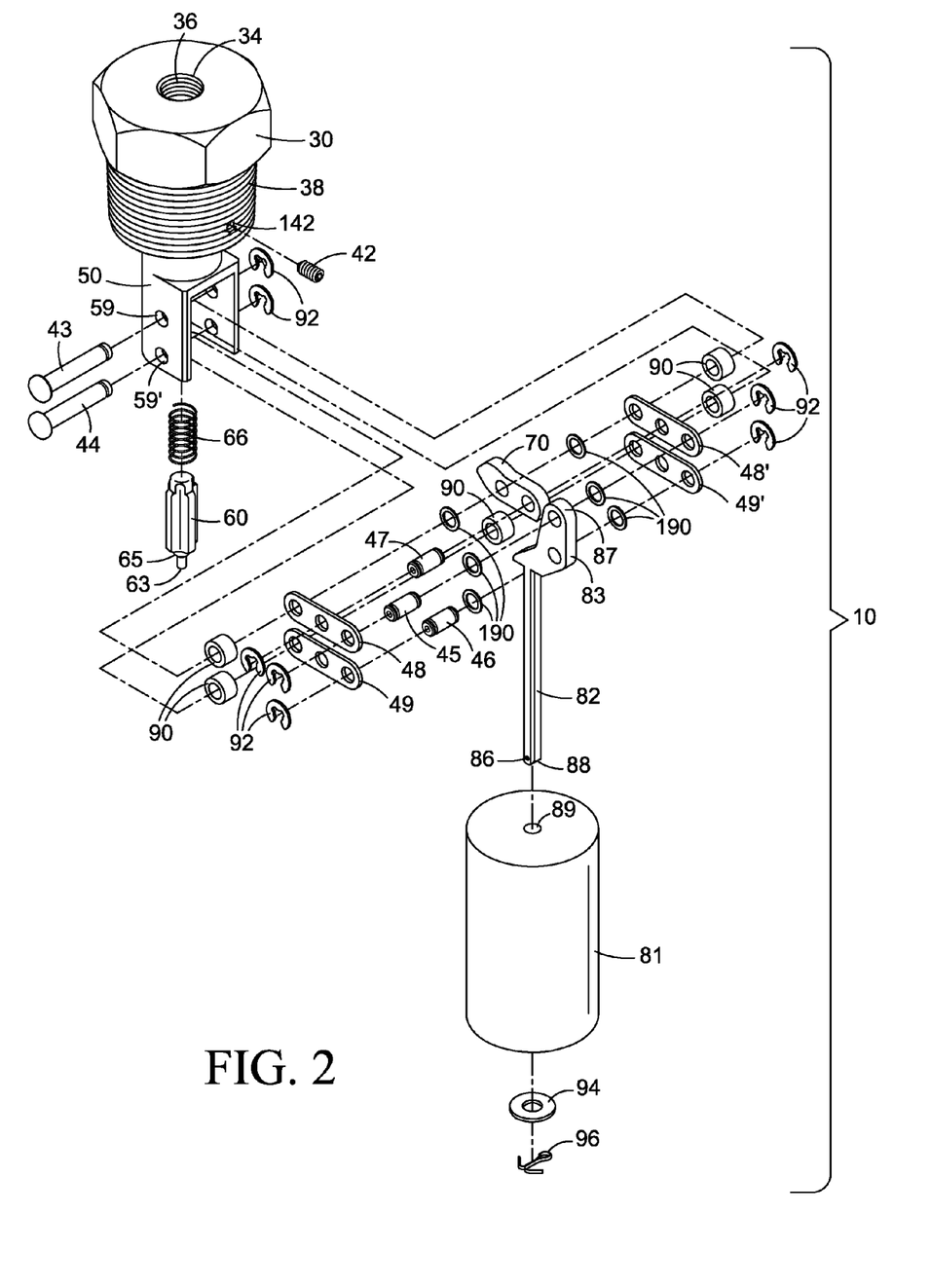
FIG. 2 is an exploded view of the first exemplary vertical float valve assembly of FIG. 1.

FIG. 1 illustrates an exemplary vertical float valve assembly 10. The vertical float valve assembly 10 further illustrated in FIGS. 2 through 8. The vertical float valve assembly 10 comprising a fitting adapter 30, a body housing 50, an upper (first) parallel link assembly 148, a lower (second) parallel link assembly 149, and a float arm assembly 80.

In the exemplary vertical float valve assembly 10 illustrated in FIGS. 1 through 8, the float valve assembly is configured as a four-bar linkage where the body housing 50 is the first bar, the upper parallel link assembly 148 is the second bar, the lower parallel link assembly 149 is the third bar, and the float arm assembly is the fourth bar.

Figure 8:
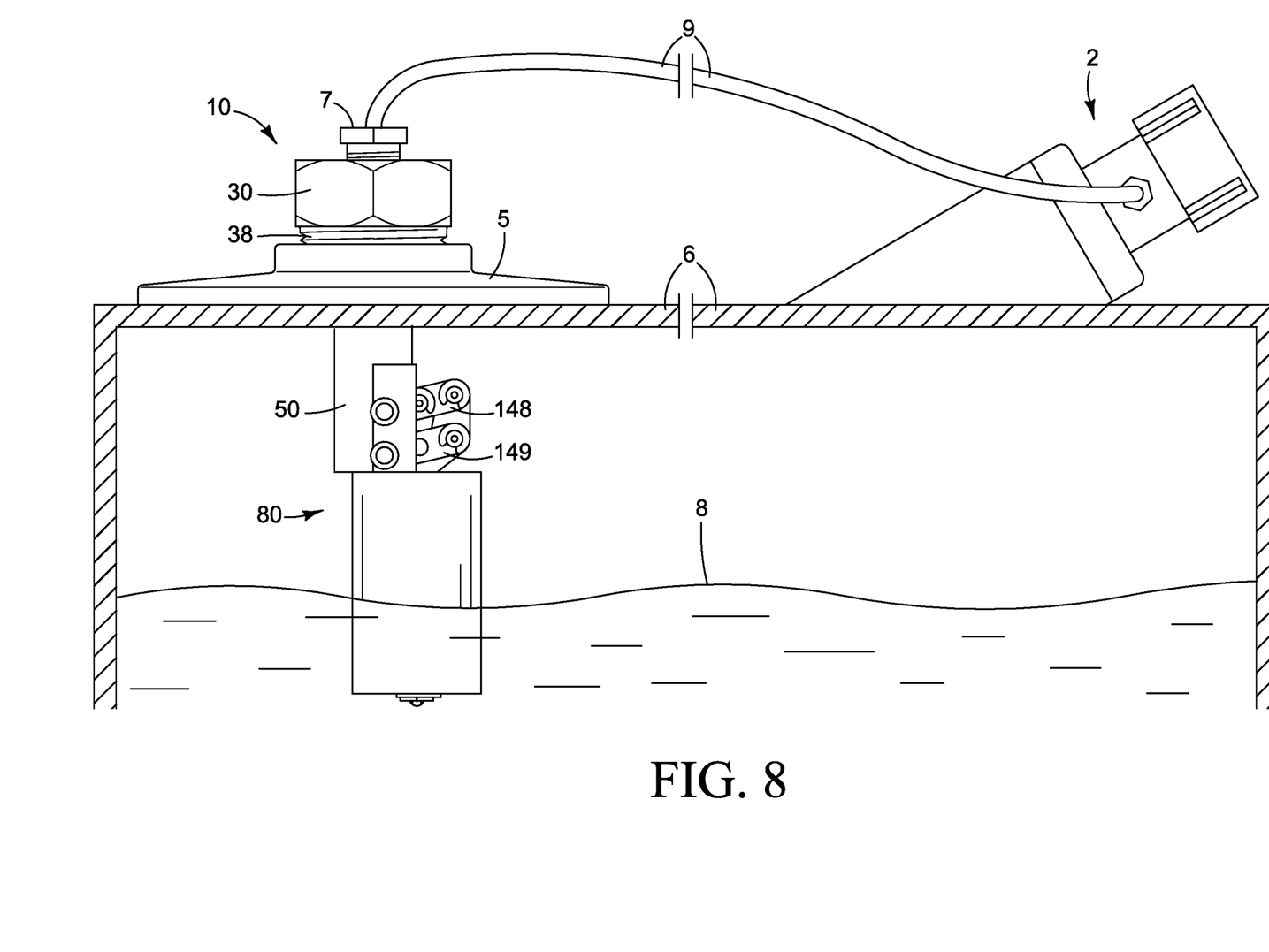
FIG. 8 is a side view of a system in which the first exemplary vertical float valve assembly of FIG. 1 could be used.

The vertical float valve assembly 10 can be used with a container for holding a fluid (e.g., fluid reservoir, fuel tank for holding fuel). In one exemplary vertical float valve assembly 10, the container is the fuel tank 6 of a locomotive. Typically, a locomotive's fuel tank 6 will have a National Pipe Thread (NPT) port 5, as illustrated in FIG. 8, through a wall (typically the top wall) of the fuel tank 6. This port 5 is typically used as a vent tube and/or to connect the locomotive's fuel tank 6 to the existing receiver using a flexible tube, and is typically internally threaded. By utilizing an existing port, the fuel tank does not need to be drained so that a hole can be cut for the vertical float valve assembly, resulting in the ability to install the vertical float valve assembly on a fuel tank in a matter of minutes.

In the exemplary vertical float valve assembly 10 illustrated in FIG. 8, the tank fitting adapter 30, via external threads 38 on the tank fitting adapter receiver 39, is threaded into the port 5 so that the body housing 50, first parallel link assembly 148, second parallel link assembly 149, and float arm assembly 80 are located inside the fuel tank 6. The float arm assembly 80, upper parallel link assembly 148, lower parallel link assembly 149, and the body housing 50 are configured and sized for insertion through the port 5 and into the fuel tank 6.

Figure 7:
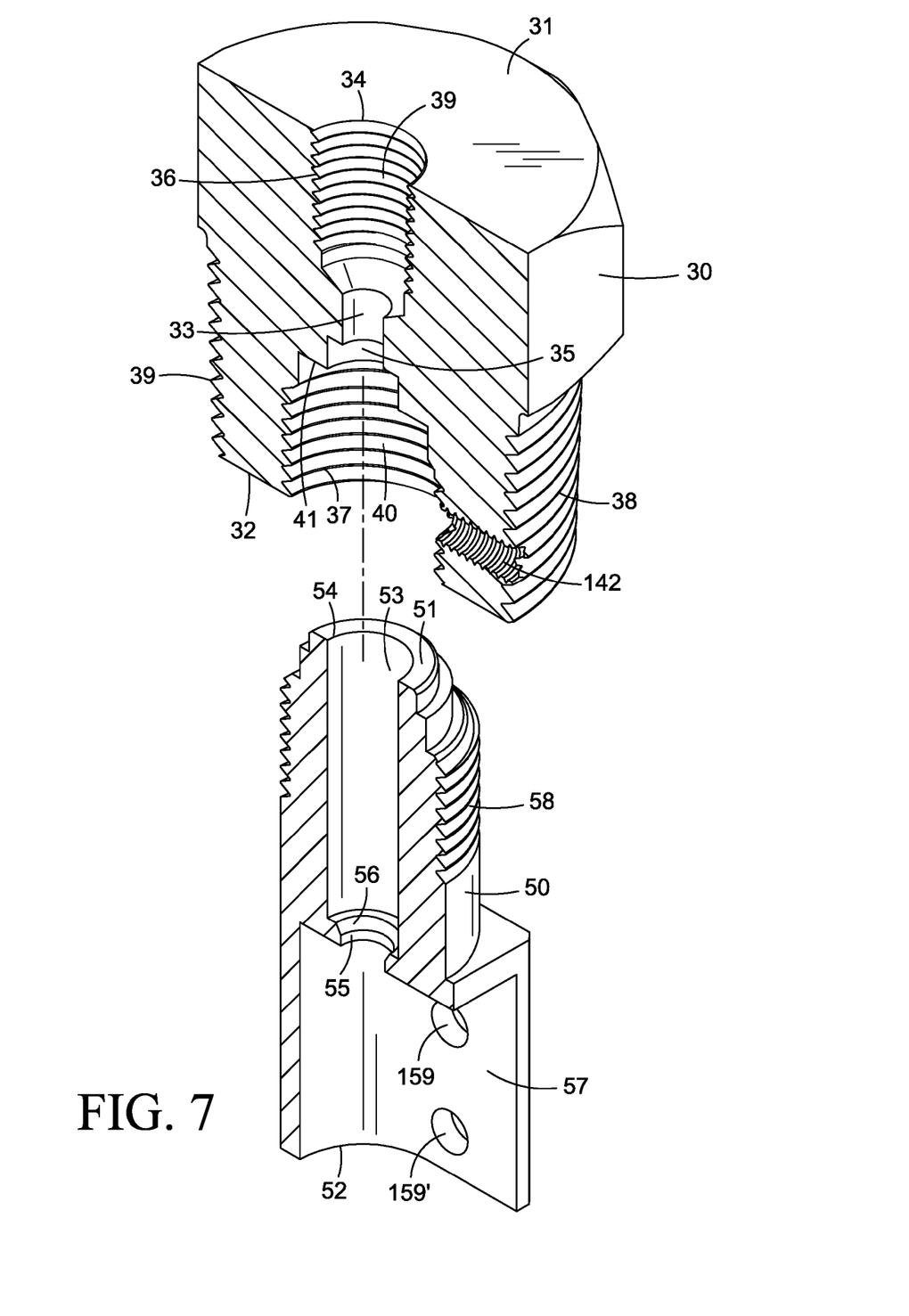
FIG. 7 is a partial, exploded view of the first exemplary vertical float valve assembly of FIG. 1.

As illustrated in FIG. 7, the fitting adapter 30 comprises an upper end 31, a lower end 32, and a fluid passageway 33 defined between an inlet 34 and an outlet 35. A portion of the outside surface of the fitting adapter 30 comprising external threads 38 for allowing the fitting adapter 30, as discussed above, to be threaded into an internally threaded hole or recess, such as port 5 illustrated in FIG. 8.

The fitting adapter 30 further comprising a threaded passageway 142 extending from the outside of the fitting adapter 30 to an outlet receiver 40 defined therein. The threaded passageway 142 configured for receiving a set screw 42 therein.

The inlet 34, having an inlet receiver 39 threaded via inlet threads 36, for fluid connection, via a connector (e.g., fitting 7), to a source of fluid. The receiver 39 fluidly connecting with a passageway 33. The passageway 33 extends through the tank fitting adapter 30 from the inlet 34 to an outlet 35.

The outlet 35 opening into an outlet receiver 40 threaded with outlet threads 37 and configured for threaded receipt of a portion of the body housing 50 (e.g., upper end 51) therein. The outlet receiver 40 comprising an outlet receiver upper face 41 adjacent the outlet 35.

The body housing 50 comprising an upper end 51, a lower end 52, and a cylinder 53 defined between an upper opening 54 and a lower opening 55. The cylinder 53 configured for slidably receiving a valve closure element (e.g., shuttle piston 60) therein. In such a configuration, the exemplary vertical float valve assembly has a "valve chamber" defined as the passageway extending from inlet 34 to the lower opening 55.

A portion of the outside surface of the body housing 50 comprising external threads 58 for allowing the body housing 50, as discussed above, to be threaded into the outlet receiver 40 thereby fluidly connecting the inlet 34 to the lower opening 55.

The body housing 50 comprising a valve sealing device (e.g., seat 56). In the exemplary vertical float assembly illustrated in FIGS. 1 through 8, the valve sealing device comprises a seat 56 surrounding the lower opening 55, the seat 56 configured for mating with a sealing element (e.g. O-ring 65) of the shuttle piston 60, thereby closing the valve.

The body housing 50 further comprising a receiver 57 for pivotally connecting the body housing 50 to an upper parallel link assembly 148 and a lower parallel link assembly 149. The receiver 57 further comprising a pair of upper pin apertures 59, 159 and a pair of lower pin apertures 59', 159' for respectively receiving an upper valve pin 43 and a lower valve pin 44 therein, as described below.

The body housing 50 further comprising a valve closure element (e.g., sealing element, O-ring 65). In the exemplary float valve assembly 10 of FIGS. 1 through 8, the valve closure element comprises a piston 60 slidably disposed within the cylinder 53. The piston 60 comprising an O-ring 65. The O-ring 65 configured for sealing engagement with the seat 56, thereby closing the valve.

The piston 60 having a rear end 61 and a front end 62. The front end 62 of the piston 60 defining an elongated boss (cam follower) 63 configured for engaging a cam member (cam lobe) 73 of a valve cam on the upper parallel link assembly 148. The elongated boss 63 configured for extending through the lower opening 55. The elongated boss 63 configured for manipulation by the cam member 73 of the valve cam 70 of the upper parallel link assembly 148.

The front end 62 further comprising a sealing element (e.g., O-ring 65) configured for sealing engagement with the valve sealing device (e.g., seat 56) adjacent the lower opening 55.

The rear end 61 configured for contacting a biasing means (e.g., resilient member, spring 66) at a first end of the spring 66. The second end of the spring 66 contacting the outlet receiver upper face 41, held compressed there-between. The spring 66 for biasing the shuttle piston 60 towards the valve sealing device (e.g., seat 56) of the body housing 50. The valve closure element (e.g., O-ring 65) normally held in closed relationship to the valve sealing device (e.g., seat 56) via the biasing means (e.g., spring 66).

The illustrated exemplary float valve assembly 10 having an open position (illustrated in FIGS. 4 and 5) where bleed fluid may flow from the bleed line (conduit 9) through the float valve assembly 10 and into the fuel tank 6; and a closed position (illustrated in FIGS. 1, 3 and 8) where bleed fluid is prevented from flowing through the float valve assembly 10.

Some exemplary float valve assemblies comprise a housing lock for locking the positing of the body housing 50 relative to the tank fitting adapter 30, thereby preventing rotation of the body housing 50 relative to the tank fitting adapter 30 resulting in contact of components of the float valve assembly with an internal baffle or other structure in the fuel tank. In the exemplary float valve assembly 10 illustrated in FIGS. 1 through 8, the housing lock comprises a threaded passageway 142 defined through the sidewall of the fitting adapter 30 and into the outlet receiver 40. The threaded passageway 142 configured for receipt of a set screw 42 therethrough. The set screw 42 configured for tightening against the portion of the body housing 50 thereby fixing the body housing 50 to the fitting adapter 30. Other exemplary fitting adapters may not include such a threaded passageway/set screw assembly.

The body housing 50 further having a receiver 57 for connecting with the upper parallel link assembly 148 and the lower parallel link assembly 149. The receiver 57 defining a pair of upper pin apertures 59, 159 configured for receiving an upper valve pin 43 there-through, defining a first pivotal connector at the lower pin aperture 59, and a second pivotal connector at the upper pin aperture 159. The receiver 57 defining a pair of lower pin apertures 59', 159' configured for receiving a lower valve pin 44 there-through, defining a third pivotal connector at the upper pin aperture 59', and a fourth pivotal connector at the lower pin aperture 159'.

Figure 5:
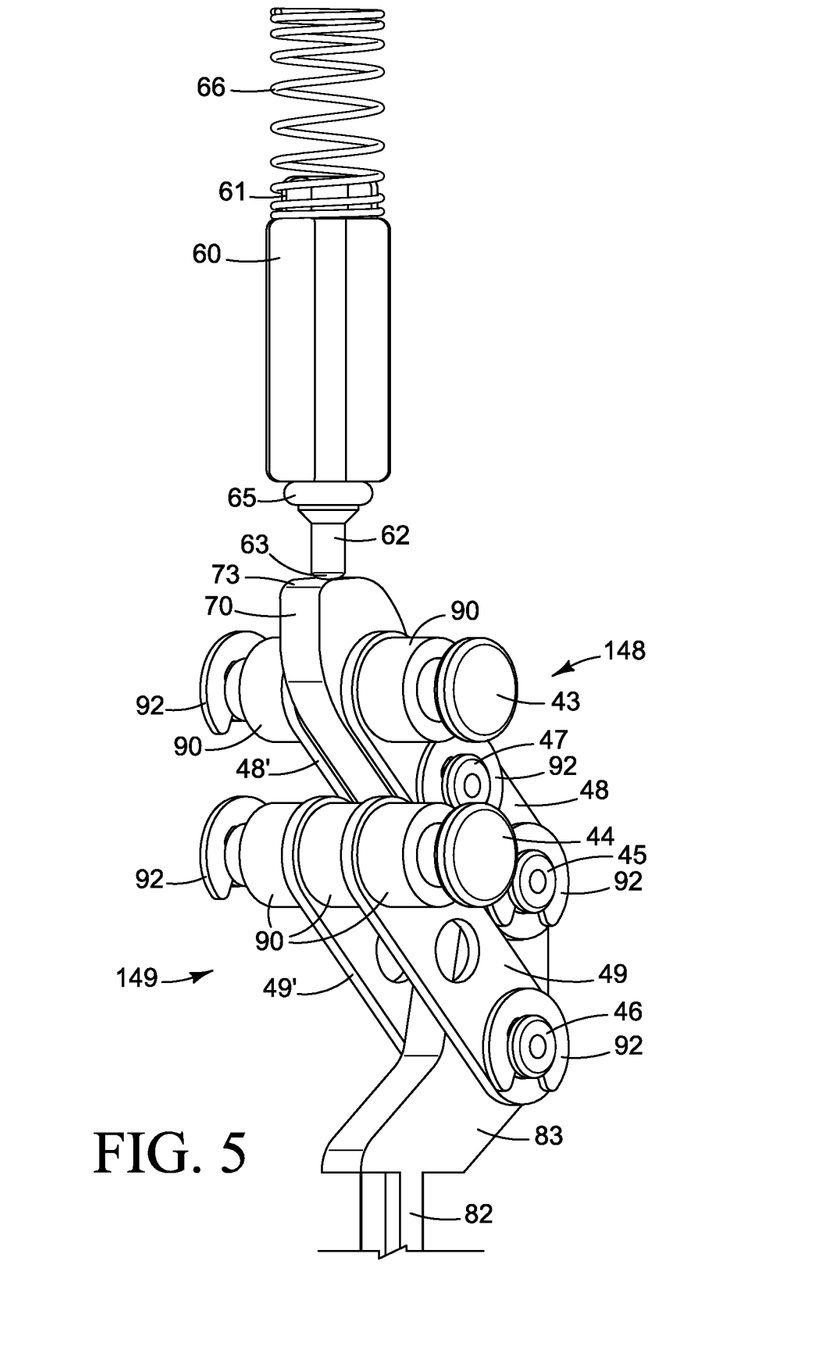
FIG. 5 is a partial, perspective view of the first exemplary vertical float valve assembly of FIG. 1, illustrated in the open position.
Figure 6:
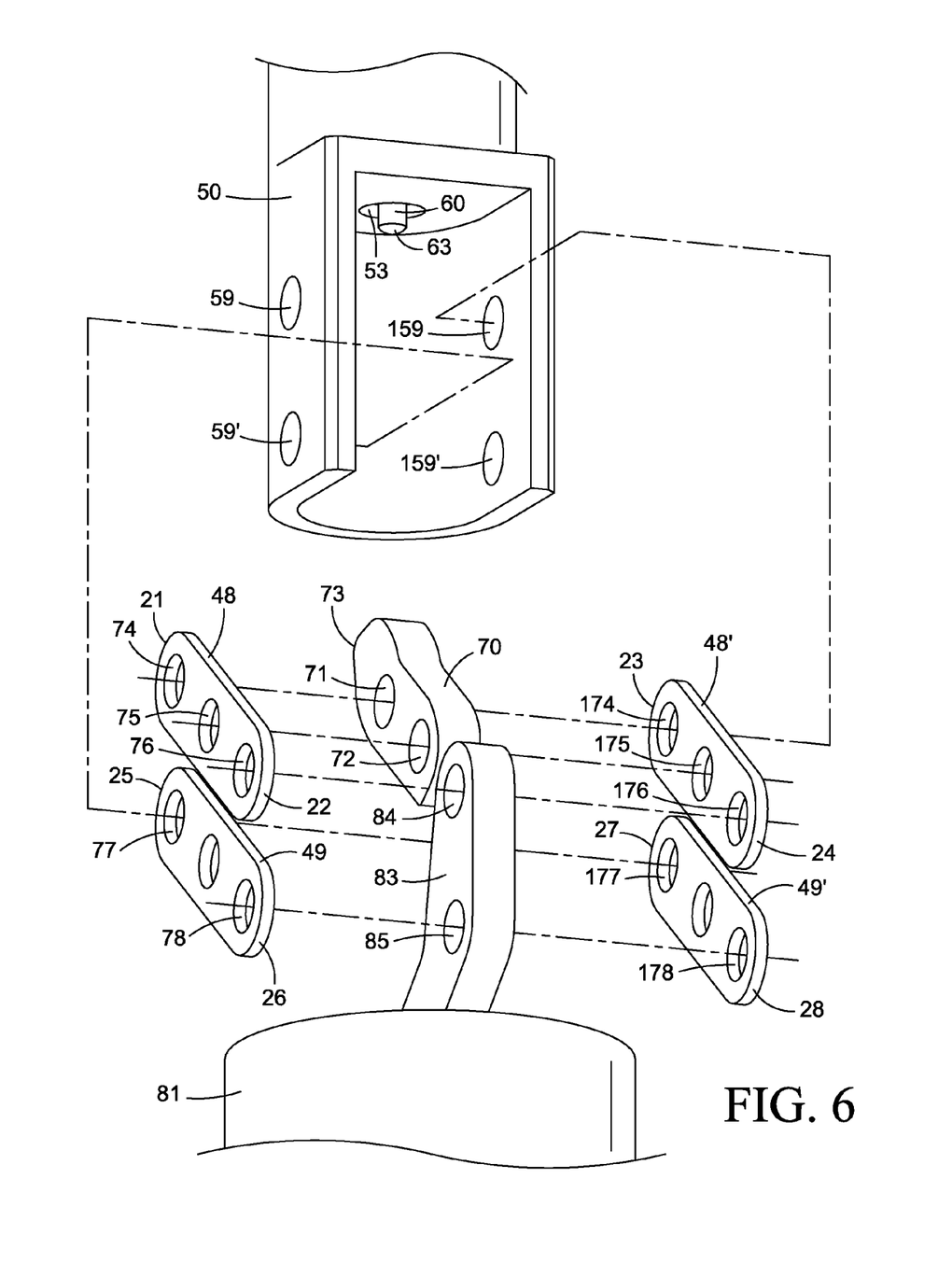
FIG. 6 is a partial, exploded view of the first exemplary vertical float valve assembly of FIG. 1.

As particularly illustrated in FIG. 6, the upper parallel link assembly 148 pivotally interconnects the body housing 50 and the float arm assembly 80. The upper parallel link assembly 148 comprises a cam member 73 and an upper parallel link 48. In the exemplary upper parallel link assembly 148 illustrated in FIGS. 1 through 8, the upper parallel link assembly 148 comprises a first upper parallel link 48, a second upper parallel link 48' and a cam member 73.

The first upper parallel link 48 comprising a first end 21, a second end 22, an upper aperture 74, a center aperture 75 and a lower aperture 76. The first end 21 and the second end 22 defining a longitudinal axis there-between. The second upper parallel link 48' comprising a first end 23, a second end 24, an upper aperture 174, a center aperture 175 and a lower aperture 176.

The first lower parallel link 49 comprising a first end 25, a second end 26, an upper aperture 77, and a lower aperture 78. The first end 25 and the second end 26 defining a longitudinal axis there-between. The second lower parallel link 49' comprising a first end 27, a second end 28, an upper aperture 177, and a lower aperture 178. The second parallel link assembly longitudinal axis is parallel to the first parallel link assembly longitudinal axis.

The valve cam member 70 comprising a first cam aperture 71, a second cam aperture 72 and the cam member 73.

The upper parallel link assembly 148 configured for pivotally connecting to the body housing 50.

In the exemplary upper parallel link assembly 148 illustrated in FIGS. 1 through 8, assembly 148 pivotally connects to the body housing 50 at the receiver 57 via the upper valve pin 43 extending through the upper pin aperture 59, through the upper aperture 74, through the first cam aperture 71, through the upper aperture 174 and through the upper pin aperture 159. Suitable fasteners (e.g., clip fastener 92) and spacers (e.g., spacer 90, spacer 190), as needed, can be used to fix the assembly in place.

In the exemplary upper parallel link assembly 148 illustrated in FIGS. 1 through 8, assembly 148 pivotally connects to the float arm assembly 80 via a upper float pin 45 extending through the lower aperture 76, through the upper float arm aperture 84, and through the lower aperture 76. Suitable fasteners (e.g., clip fastener 92) and spacers (e.g., spacer 90, spacer 190), as needed, can be used to fix the assembly in place.

In the exemplary upper parallel link assembly 148 illustrated in FIGS. 1 through 8, an interconnect pin 47 extends through the center aperture 75, through the second cam aperture 72, and through the center aperture 175. Suitable fasteners (e.g., clip fastener 92), as needed, can be used to fix the assembly in place.

In the exemplary lower parallel link assembly 149 illustrated in FIGS. 1 through 8, assembly 149 pivotally connects to the body housing 50 at the receiver 57 via the lower valve pin 44 extending through the lower pin aperture 59', through the upper aperture 77, through the upper aperture 177 and through the lower pin aperture 159'. Suitable fasteners (e.g., clip fastener 92) and spacers (e.g., spacer 90), as needed, can be used to fix the assembly in place.

In the exemplary lower parallel link assembly 149 illustrated in FIGS. 1 through 8, assembly 149 pivotally connects to the float arm assembly 80 via a lower float pin 46 extending through the lower aperture 78, through the lower float arm aperture 85, and through the lower aperture 78. Suitable fasteners (e.g., clip fastener 92) and spacers (e.g., spacer 190), as needed, can be used to fix the assembly in place.

In the exemplary vertical float valve assembly 10 illustrated in FIGS. 1 through 8, the float arm assembly 80 has an upper end and a lower end. The float arm assembly 80 having a float 81 and a float arm 82. The float 81 connecting to the float arm 82. The float arm assembly 80 illustrated in FIGS. 1 through 8 illustrating the connection between the float 81 and the float arm 82 accomplished via the float 81 defining a passageway 89 there-through which the float arm 82 can extend, the float 81 held on the float arm 82 via a fastener (e.g., washer 94 and split pin 96) connecting with the float arm 82 at a lower aperture 86. The float arm assembly 80 further comprising a head portion 83 defining the upper float arm aperture 84 and lower float arm aperture 85 there-through. The float arm assembly 80 is positionable within the fuel tank so as to respond to the fluid level in the fuel tank.

Figure 3:
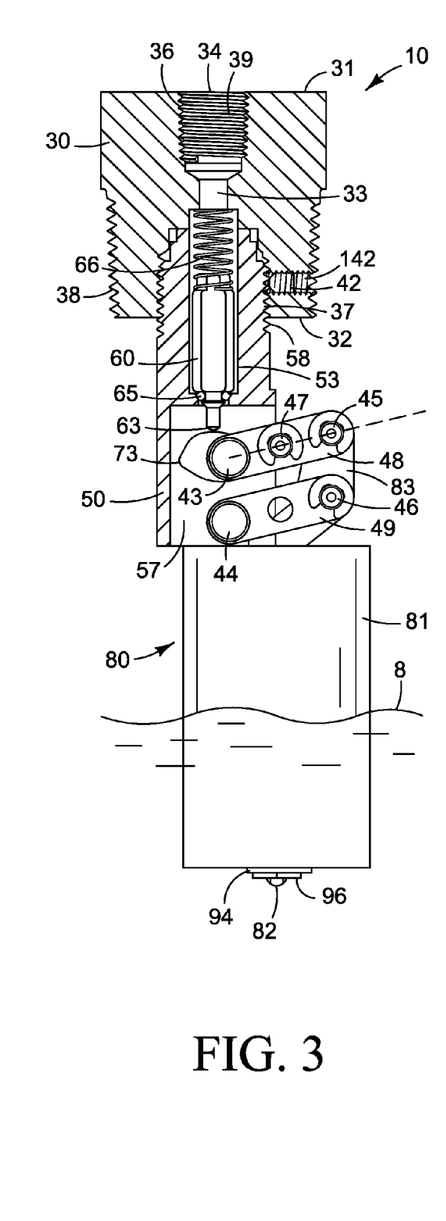
FIG. 3 is a side, cross-sectional view of the first exemplary vertical float valve assembly of FIG. 1, illustrated in the closed position.

As illustrated in FIG. 3, the vertical float valve assembly 10 has a "closed" configuration where flow of a fluid into the inlet 34 and out of the lower opening 55 is prevented by the valve sealing device (e.g., seat 56), biased by biasing means (e.g., spring 66), mating with the sealing element (e.g. O-ring 65) of the shuttle piston 60, thereby closing the valve.

Figure 4:
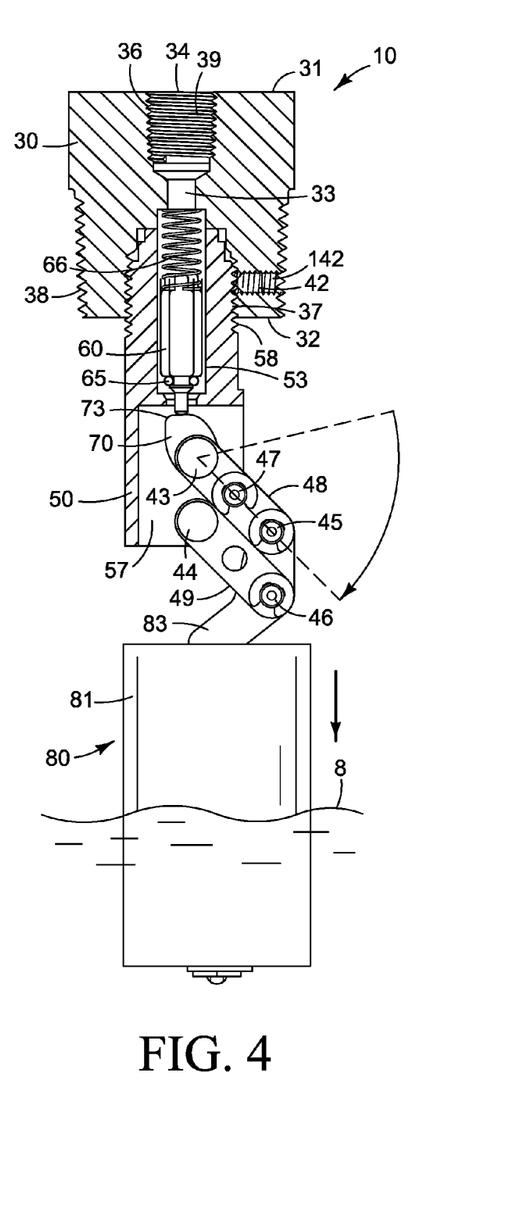
FIG. 4 is a side, cross-sectional view of the first exemplary vertical float valve assembly of FIG. 1, illustrated in the open position.

As illustrated in FIGS. 4 and 5, the vertical float valve assembly 10 has an "open" configuration where flow of a fluid into the inlet 34 and out of the lower opening 55 is permitted. In this configuration, the rotation of the valve cam 70 at the upper valve pin 43 causes the cam member 73 to move the sealing element (e.g., O-ring 65) out of sealing engagement with the valve sealing device (e.g., seat 56), thereby opening the valve.

FIG. 8 illustrates an exemplary refueling apparatus which an exemplary vertical float valve assembly 10 could be used. An example refueling apparatus can be found in U.S. application Ser. No. 12/485,646 (filed Jun. 16, 2009), and U.S. application Ser. No. 12/767,310 (filed Apr. 26, 2010), the disclosure of which are incorporated herein by reference.

The refueling apparatus comprising a fluid flow control valve 2 which, working in concert with the exemplary vertical float valve assembly 10, can be opened or closed, thereby shutting off a flow of fuel from a fuel source through the fluid flow control valve 2 and into the fuel tank 6. The fuel tank 6 comprising an air space above a fluid space, surface of the fluid space defining a fluid level 8 within the fuel tank 6. The fluid flow control valve 2 fluidly connected to the vertical float valve assembly 10 via a conduit 9. The conduit 9 having a first end terminating in a fitting 7 which connects with the vertical float valve assembly 10 at the inlet 34.

The conduit 9 for fluidly interconnecting the vertical float valve assembly 10 to the fluid flow control valve 2 so that when both the vertical float valve assembly 10 and the fluid flow control valve 2 are open, bleed fluid passes from the fluid flow control valve 2, through the conduit 9, and into the inlet 34 of the vertical float valve assembly 10. When a predetermined level of fluid in the fuel tank 6 is reached (for instance, the fluid level 8 illustrated in FIG. 8), vertical float valve assembly 10 closes, stopping the flow of bleed fluid which triggers the closure of the fluid flow control valve 2.

When the vertical float valve assembly 10 is closed, bleed flow from the conduit 9 through the inlet 34 and out the lower opening 55 is terminated. Closure of the vertical flow valve assembly 10 results in closure of the fluid flow control valve 2, thereby stopping the refueling of the fuel tank 6 through the fluid flow control valve 2. The exemplary fluid flow control valve 2 illustrated in FIG. 8 is merely representative of one type of fluid flow control valve.

The float arm assembly 80 pivotally connects to the body housing 50 via the upper parallel link assembly 148 and the lower parallel link assembly 149 as a four-bar linkage. In such a configuration, vertical movement of the float arm assembly (e.g., as the fluid level 8 in the fuel tank 6 raises) in a first (upwards) direction results in (movement) rotation of the upper parallel link assembly 148 and the lower parallel link assembly 149, both at their connections with the body housing 50 and the float arm assembly. As the upper parallel link assembly 148 is so moved, the cam member 73 variably contacts the boss 63 of the piston 60, allowing the biasing means (e.g., spring 66) to move the valve sealing element (e.g., O-ring 65) into sealing engagement with the valve sealing device (e.g., seat 56), thereby closing the valve.

Whereas, vertical movement of the float arm assembly (e.g., as the fluid level 8 in the fuel tank 6 lowers) in the second (downwards) direction results in (movement) rotation upper parallel link assembly 148 and the lower parallel link assembly 149, both at their connections with the body housing 50 and the float arm assembly. As the upper parallel link assembly 148 is so moved, the cam member 73 variably contacts the boss 63 of the piston 60, pressing the boss 63 upwards (away from the lower opening 55), overcoming the biasing means (e.g., spring 66) and moving the valve sealing element (e.g., O-ring 65) away from sealing engagement with the valve sealing device (e.g., seat 56), thereby opening the valve.

Additional Exemplary Float Valve Assembly. A float valve having a float for opening and closing the valve. The float connects with the valve via a four-bar linkage. The float valve having an open position where fluid may flow from a fluid source, through the float valve, and into a container. The float valve having a closed position where fluid is prevented from flowing through the float valve. The open and closed positions controlled by the raising and lowering of the float.

Additional Exemplary Float Valve Assembly. A valve assembly for use in a fluid reservoir. The valve assembly comprising a body housing, a first parallel link assembly, a second parallel link assembly and a float arm assembly. The body housing comprising a valve chamber with an inlet and an outlet. The outlet comprising a valve sealing device. The body housing comprising a valve closure element positioned in the valve chamber and normally held in closed relationship to the valve sealing device via a biasing means. The valve closure element movable into and out of fluid sealing engagement with the valve sealing device. The first parallel link assembly comprising a first end and a second end defining a longitudinal axis. The first parallel link assembly first end pivotally connected to the body housing adjacent the outlet at a first pivotal connector. The first parallel link assembly second end pivotally connected to the float arm assembly at a second pivotal connector. The second parallel link assembly comprising a first end and a second end defining a longitudinal axis. The second parallel link assembly first end pivotally connected to the body housing at a third pivotal connector. The second parallel link assembly second end pivotally connected to the float arm assembly at a fourth pivotal connector. The float arm assembly positionable within the fluid reservoir to respond to a fluid level therein. The second parallel link assembly longitudinal axis is parallel to the first parallel link assembly longitudinal axis. The first pivotal connector and the third pivotal connector define a housing connector axis there-between. The second pivotal connector and the fourth pivotal connector define a float connector axis there-between. The housing connector axis is parallel to the float connector axis.

The valve closure element comprising a piston having an elongated boss extending therefrom, the elongated boss configured for extending through the outlet and projecting a distance outwardly from the body housing. The first parallel link assembly first end comprising a cam member, the cam member contactingly engageable with the elongated boss. The first parallel link assembly comprising a first upper parallel link, the first upper parallel link comprising: a first end, a second end, an upper aperture extending through the first upper parallel link and a lower aperture extending through the first upper parallel link. The first parallel link assembly comprising a second upper parallel link, the second upper parallel link comprising: a first end, a second end, an upper aperture extending through the second upper parallel link, a center aperture extending through the second upper parallel link, and a lower aperture extending through the second upper parallel link. The first parallel link assembly comprising a valve cam, the valve cam comprising a cam member, a first cam aperture and a second cam aperture. The first parallel link assembly comprising a first center aperture extending through the first upper parallel link, a second cam aperture extending through the valve cam, and a second center aperture extending through the second upper parallel link, and wherein the first parallel link assembly comprising an interconnect pin extending through the first center aperture, the second cam aperture, and the second center aperture.

The body housing comprising a first upper pin aperture defined through the body housing, the first upper pin aperture aligned with a second upper pin aperture defined through the body housing, and a first lower pin aperture defined through the body housing, the first lower pin aperture aligned with a second lower pin aperture defined through the body housing. The first parallel link assembly first end's pivotal connection to the body housing at the first pivotal connector comprising an upper valve pin extending through the first upper pin aperture, the first upper parallel link upper aperture, the first cam aperture, the second upper parallel link upper aperture, and the second upper pin aperture. The float arm assembly comprising a head portion, an arm and a float, wherein the head portion defining there-through an upper float arm aperture and a lower float arm aperture. Movement of the float arm assembly, in response to the fluid level, in an downwards direction causes rotation at the first pivot point and the second pivot point in a first direction, causing the cam member to variably contact the boss of the piston, opening the valve by unseating the valve sealing device; and wherein movement of the float arm assembly, in response to the fluid level, in a upwards direction causes rotation at the first pivot point and the second pivot point in a second direction, causing the cam member to variably contact the elongated boss, closing the valve assembly by allowing the biasing means to reseat the valve sealing device.

The first parallel link assembly comprising a first upper parallel link and a second upper parallel link, wherein the first parallel link assembly second end's pivotal connection to the float arm assembly at the second pivotal connector comprising a lower float pin extending through an upper aperture defined through the first upper parallel link, the lower float arm aperture, and an upper aperture defined through the second upper parallel link. The second parallel link assembly comprising a first lower parallel link and a second lower parallel link; wherein the second parallel link assembly first end's pivotal connection to the body housing at the third pivotal connector comprising a lower valve pin extending through the first lower pin aperture, the first lower parallel link lower aperture, the second lower parallel link lower aperture, and the second lower pin aperture; and wherein the first parallel link assembly first end's pivotal connection to the float arm assembly at the fourth pivotal connector comprising: a lower float pin extending through an upper aperture defined through the first upper parallel link, the lower float arm aperture, and an upper aperture defined through the second upper parallel link. The valve sealing device comprising a seat, wherein the valve closure element comprising an O-ring, and wherein the biasing means comprising a spring. The valve assembly further comprising a tank fitting adapter, the tank fitting adapter for mounting the body housing on a reservoir.

Additional Exemplary Float Valve Assembly. Another exemplary float valve comprising a valve assembly for use in a fluid reservoir. The valve assembly comprising a body housing, a first parallel link assembly, a second parallel link assembly and a float arm assembly. The body housing comprising a valve chamber with an inlet and an outlet. The outlet defining a seat. The body housing comprising a piston positioned in the valve chamber. The piston comprising a sealing means for sealing engagement to the seat. The sealing means normally held in closed relationship to the seat via a spring. The sealing means movable into and out of fluid sealing engagement with the seat. The first parallel link assembly comprising a first end and a second end defining a longitudinal axis. The first parallel link assembly first end pivotally connected to the body housing adjacent the outlet at a first pivotal connector. The first parallel link assembly second end pivotally connected to the float arm assembly at a second pivotal connector. The second parallel link assembly comprising a first end and a second end defining a longitudinal axis. The second parallel link assembly first end pivotally connected to the body housing at a third pivotal connector. The second parallel link assembly second end pivotally connected to the float arm assembly at a fourth pivotal connector. The float arm assembly positionable within the fluid reservoir to respond to a fluid level therein. The second parallel link assembly longitudinal axis is parallel to the first parallel link assembly longitudinal axis. The first pivotal connector and the third pivotal connector define a housing connector axis there-between. The second pivotal connector and the fourth pivotal connector define a float connector axis there-between. The housing connector axis is parallel to the float connector axis. The piston comprising an elongated boss. The elongated boss configured for extending through the outlet and projecting a distance outwardly from the body housing. The first parallel link assembly first end comprising a cam member. The cam member contactingly engageable with the elongated boss. Movement of the float arm assembly, in response to the fluid level, in an downwards direction causes rotation at the first pivot point and the second pivot point in a first direction, causing the cam member to variably contact the boss of the piston, opening the valve by unseating the sealing means. Movement of the float arm assembly, in response to the fluid level, in a upwards direction causes rotation at the first pivot point and the second pivot point in a second direction, causing the cam member to variably contact the elongated boss, closing the valve assembly by allowing the biasing means to reseat the sealing means against the seat.

Any suitable structure and/or material can be used for the vertical float valve assembly, and a skilled artisan will be able to select an appropriate structure and material for the vertical float valve assembly in a particular embodiment based on various considerations, including the intended use of the vertical float valve assembly, the intended arena within which the vertical float valve assembly will be used, and the equipment and/or accessories with which the vertical float valve assembly is intended to be used, among other considerations.

The inventor has determined that conventional polymeric and metal materials are suitable for use in the various components of the vertical float valve assembly. For example, the float, spacers, piston, O-ring, and associated components can be injection-molded from suitable plastics known in the art. The tank fitting adapter, body housing, valve pins, links, float arm/head portion, and associated components can be formed from metal materials, including stainless steel and other suitable metals. Materials hereinafter discovered and/or developed that are determined to be suitable for use in float valve assemblies would also be considered suitable for use in a vertical float valve assembly according to a particular embodiment.

It is noted that all structure and features of the various described and illustrated embodiments can be combined in any suitable configuration for inclusion in a vertical float valve assembly according to a particular embodiment.

The foregoing detailed description provides exemplary embodiments of the invention and includes the best mode for practicing the invention. The description and illustration of these embodiments is intended only to provide examples of the invention, and not to limit the scope of the invention, or its protection, in any manner.

I claim:

1. A valve assembly for use in a fluid reservoir, said valve assembly comprising a body housing, a first parallel link assembly, a second parallel link assembly and a float arm assembly, wherein:

said body housing having a valve chamber with an inlet and an outlet, the outlet defining a seat, the body housing having a piston positioned in said valve chamber, said piston having a sealing means for sealing engagement to said seat, said sealing means normally held in closed relationship to said seat via a spring, said sealing means movable into and out of fluid sealing engagement with said seat;

said first parallel link assembly comprising a first end and a second end defining a longitudinal axis, said first parallel link assembly first end pivotally connected to said body housing adjacent said outlet at a first pivotal connector, said first parallel link assembly second end pivotally connected to said float arm assembly at a second pivotal connector;

said second parallel link assembly comprising a first end and a second end defining a longitudinal axis, said second parallel link assembly first end pivotally connected to said body housing at a third pivotal connector, said second parallel link assembly second end pivotally connected to said float arm assembly at a fourth pivotal connector, and;

said float arm assembly positionable within said fluid reservoir to respond to a fluid level therein.

2. The valve assembly of claim 1, wherein said second parallel link assembly longitudinal axis is parallel to said first parallel link assembly longitudinal axis, and wherein said first pivotal connector and said third pivotal connector define a housing connector axis there-between, wherein said second pivotal connector and said fourth pivotal connector define a float connector axis there-between, wherein said housing connector axis is parallel to said float connector axis.

3. The valve assembly of claim 2, wherein said piston comprises an elongated boss, said elongated boss configured for extending through said outlet and projecting a distance outwardly from said body housing, and wherein said first parallel link assembly first end comprises a cam member, said cam member contactingly engageable with said elongated boss.

4. The valve assembly of claim 3, wherein movement of said float arm assembly, in response to said fluid level, in an downwards direction causes rotation at the first pivot point and said second pivot point in a first direction, causing said cam member to variably contact said boss of said piston, opening said valve by unseating said sealing means; and wherein movement of said float arm assembly, in response to said fluid level, in a upwards direction causes rotation at the first pivot point and said second pivot point in a second direction, causing said cam member to variably contact said elongated boss, closing said valve assembly by allowing said spring to reseat said sealing means against said seat.

5. A valve assembly for use in a fluid reservoir, said valve assembly comprising a body housing, a first parallel link assembly, a second parallel link assembly and a float arm assembly, wherein:

said body housing having a valve chamber with an inlet and an outlet, the outlet defining a valve sealing device, the body housing having a valve closure element positioned in said valve chamber and normally held in closed relationship to said valve sealing device via biasing means, said valve closure element movable into and out of fluid sealing engagement with said valve sealing device;

said first parallel link assembly comprising a first end and a second end defining a longitudinal axis, said first parallel link assembly first end pivotally connected to said body housing adjacent said outlet at a first pivotal connector, said first parallel link assembly second end pivotally connected to said float arm assembly at a second pivotal connector;

said second parallel link assembly comprising a first end and a second end defining a longitudinal axis, said second parallel link assembly first end pivotally connected to said body housing at a third pivotal connector, said second parallel link assembly second end pivotally connected to said float arm assembly at a fourth pivotal connector, and;

said float arm assembly positionable within said fluid reservoir to respond to a fluid level therein;

wherein said second parallel link assembly longitudinal axis is parallel to said first parallel link assembly longitudinal axis, and wherein said first pivotal connector and said third pivotal connector define a housing connector axis there-between, wherein said second pivotal connector and said fourth pivotal connector define a float connector axis there-between, wherein said housing connector axis is parallel to said float connector axis.

6. The valve assembly of claim 5, wherein said float arm assembly comprises a head portion, an arm and a float, wherein said head portion defining there-through an upper float arm aperture and a lower float arm aperture.

7. The valve assembly of claim 5, wherein said first parallel link assembly comprises a first upper parallel link and a second upper parallel link, wherein said first parallel link assembly second end's pivotal connection to said float arm assembly at said second pivotal connector comprises a lower float pin extending through an upper aperture defined through said first upper parallel link, a lower float arm aperture defined through said float arm assembly, and an upper aperture defined through said second upper parallel link.

8. The valve assembly of claim 5, wherein said second parallel link assembly comprises a first lower parallel link and a second lower parallel link; wherein said second parallel link assembly first end's pivotal connection to said body housing at said third pivotal connector comprises a lower valve pin extending through said first lower pin aperture, said first lower parallel link lower aperture, said second lower parallel link lower aperture, and said second lower pin aperture; and wherein said first parallel link assembly first end's pivotal connection to said float arm assembly at said fourth pivotal connector comprises: a lower float pin extending through an upper aperture defined through said first upper parallel link, a lower float arm aperture defined through said float arm assembly, and an upper aperture defined through said second upper parallel link.

9. The valve assembly of claim 5, wherein said valve sealing device comprises a seat, wherein said valve closure element comprises an O-ring, and wherein said biasing means comprises a spring.

10. The valve assembly of claim 5, wherein said valve assembly further comprises a tank fitting adapter, said tank fitting adapter for mounting said body housing on a reservoir.

11. The valve assembly of claim 5, wherein said valve closure element comprises a piston having an elongated boss extending therefrom, said elongated boss configured for extending through said outlet and projecting a distance outwardly from said body housing.

12. The valve assembly of claim 11, wherein said first parallel link assembly first end comprises a cam member, said cam member contactingly engageable with said elongated boss.

13. The valve assembly of claim 12, wherein movement of said float arm assembly, in response to said fluid level, in an downwards direction causes rotation at the first pivotal connector and said second pivotal connector in a first direction, causing said cam member to variably contact said boss of said piston, opening said valve by unseating said valve sealing device; and wherein movement of said float arm assembly, in response to said fluid level, in a upwards direction causes rotation at the first pivotal connector and said second pivotal connector in a second direction, causing said cam member to variably contact said elongated boss, closing said valve assembly by allowing said biasing means to reseat said valve sealing device.

14. The valve assembly of claim 5, wherein said first parallel link assembly comprises a first upper parallel link, said first upper parallel link comprising: a first end, a second end, an upper aperture extending through said first upper parallel link and a lower aperture extending through said first upper parallel link.

15. The valve assembly of claim 14, wherein said first parallel link assembly comprises a second upper parallel link, said second upper parallel link comprising: a first end, a second end, an upper aperture extending through said second upper parallel link, a center aperture extending through said second upper parallel link, and a lower aperture extending through said second upper parallel link.

16. The valve assembly of claim 15, wherein said first parallel link assembly comprises a valve cam, said valve cam comprising a cam member, a first cam aperture and a second cam aperture.

17. The valve assembly of claim 16, wherein said first parallel link assembly comprises a first center aperture extending through said first upper parallel link, a second cam aperture extending through said valve cam, and a second center aperture extending through said second upper parallel link, and wherein said first parallel link assembly comprises an interconnect pin extending through said first center aperture, said second cam aperture, and said second center aperture.

18. The valve assembly of claim 16, wherein said body housing comprises a first upper pin aperture defined through said body housing, said first upper pin aperture aligned with a second upper pin aperture defined through said body housing, and a first lower pin aperture defined through said body housing, said first lower pin aperture aligned with a second lower pin aperture defined through said body housing.

19. The valve assembly of claim 18, wherein said first parallel link assembly first end's pivotal connection to said body housing at said first pivotal connector comprises an upper valve pin extending through said first upper pin aperture, said first upper parallel link upper aperture, said first cam aperture, said second upper parallel link upper aperture, and said second upper pin aperture.

* * * * *